United States Patent
Satish et al.

(10) Patent No.: US 8,452,848 B1
(45) Date of Patent: May 28, 2013

(54) FACILITATING SECURE 24X7 ON-DEMAND SERVICE AVAILABILITY WHILE MINIMIZING POWER CONSUMPTION AND POWER LOAD SPIKES

(75) Inventors: Sourabh Satish, Fremont, CA (US); Atif Mahadik, Fremont, CA (US)

(73) Assignee: Symantec Corporation, Mountain View, CA (US)

(*) Notice: Subject to any disclaimer, the term of this patent is extended or adjusted under 35 U.S.C. 154(b) by 310 days.

(21) Appl. No.: 13/018,076

(22) Filed: Jan. 31, 2011

(51) Int. Cl.
*G06F 15/16* (2006.01)

(52) U.S. Cl.
USPC .......... 709/217; 709/219; 709/224; 713/300; 713/310; 713/320

(58) Field of Classification Search
USPC .................. 709/217, 219, 224; 713/300, 310, 713/320
See application file for complete search history.

(56) References Cited

U.S. PATENT DOCUMENTS

2002/0007463 A1*  1/2002  Fung .............................. 713/320
2011/0191610 A1*  8/2011  Agarwal et al. ............... 713/310

OTHER PUBLICATIONS

Fleishman; "Wake on Demand Lets Snow Leopard Sleep With One Eye Open—A New Networking Option in OS x 10.6 Lets You Access Files on a Slumbering MAC;" Aug. 28, 2009; Macworld.com; 5 pp.

* cited by examiner

*Primary Examiner* — Frantz Jean
(74) *Attorney, Agent, or Firm* — Brill Law Office; Jeffrey Brill

(57) ABSTRACT

Secure, continuous, on-demand access to services provided by servers internal to a network is facilitated, while minimizing power consumption and power load spikes. Information concerning operation of the network is monitored, and a profile of the network is maintained. Internal network servers being in reduced power consumption states is tracked. Service requests from clients to internal network servers that are in reduced power consumption states are detected. In response, packets are generated to wake servers in reduced power consumption states, without requiring registration or installation of any components on the servers or clients. Frequencies are controlled at which packets are generated to wake servers, thereby minimizing sudden increases in power consumption associated with waking multiple servers. This can comprise waiting for a specific duration of time prior to generating packets, based on server profiles.

20 Claims, 4 Drawing Sheets

FACILITATING SECURE 24X7 ON-DEMAND SERVICE AVAILABILITY WHILE MINIMIZING POWER CONSUMPTION AND POWER LOAD SPIKES

TECHNICAL FIELD

This disclosure pertains generally to service providing computer networks, and more specifically to facilitating secure 24×7 on-demand service availability while minimizing power consumption and power load spikes.

BACKGROUND

Computer services are often provided to users by remote servers "in the cloud" under a cloud computing model. Under cloud computing, shared servers provide computing resources such as software and data to multiple remote computing devices on demand, like electricity from the grid. These services are frequently accessed through web-based tools or applications that can be run as if they were installed locally (e.g., through a web browser). On the provider end, most cloud computing infrastructures consist of services delivered through common centers and built on servers. A cloud computing infrastructure is a network of servers and other resources configured to provide a given service or set of services according to a cloud model. Smaller service providing networks can also be configured to provide services remotely on a smaller scale.

Servers are often interconnected, with one server leveraging services provided by other servers within the service providing network. In other words, servers often have dependencies on other servers. For example a server providing a web service to host files may physically store the actual files on a separate server. Such dependencies between servers can be nested multiple levels deep.

A service providing network such as a cloud computing infrastructure can consume a great deal of energy. The servers and other computing devices comprising the network use a significant amount of electricity, and keeping them powered on and ready to provide services 24 hours a day is not trivial. Contemporary computing devices typically support limited power consumption states (e.g., so called sleep or hibernation modes). By configuring servers to be in such limited power consumption states at least some of the time (e.g., after not having received a service request for a given amount of time, during off peak hours, etc.) can save a significant amount of power. Because these servers have to be available to provide services on demand at all times, the service providing network must be able to wake up its internal servers from limited power consumption states when their services are demanded.

Wake-on-LAN (WoL) is an Ethernet computer networking standard that allows a computer to be turned on or woken up by a network message. The message is usually sent by a program executed on another computer on the same network. (Similar standards and terms include Wake on WAN, Remote Wake-up, Power on by LAN, Power Up by LAN, Resume by LAN, Resume on LAN, Wake Up on LAN, etc.) WoL is implemented using a special network message called a magic packet. The magic packet contains the MAC address of the destination computer. The network interface on a listening computer waits for a magic packet addressed to it, and then initiates system wake up. WoL can be used within a service providing network to wake up servers when they are needed to provide demanded services.

However, because of the nested dependencies between servers, simply waking up an individual top level server to provide a service is not typically sufficient; any additional servers on which the top level server is dependent must also be woken up. Power consumption by a computer during power up/wake up is significantly greater than during normal operations, because hardware has greater power up needs (e.g., disks have higher spin up power consumption characteristics, etc.). Thus, sudden power consumption spikes and increased power load related issues are among the greater risks in facilitating WoL in a network. Using conventional WoL to wake up a collection of servers needed to provide a service risks creating power spikes and outages.

Apple's Bonjour service can use WoL to wake servers. However Bonjour requires that client computing devices requesting services have Bonjour compliant software, and be registered with the Bonjour service provider (an Apple AirPort or Apple Time Capsule base station). Only under those circumstances can the router issue a WoL packet when a service is requested. Thus, Bonjour works to allow, e.g., an Apple iPod registered with the base station to wake a desktop when it is going to access the desktop's copy of iTunes. However, it cannot be used to automatically allow any device to wake up a server without the device running special Bonjour software and preregistering. Furthermore, Bonjour does not provide any power profile management, and thus if a server being woken has nested dependencies, Bonjour will trigger a chain of WoL packets to be generated in quick succession to wake up the plurality of dependent servers. This can easily cause power consumption spikes and even blackouts.

It would be desirable to address these issues.

SUMMARY

A server waking power management system facilitates secure, continuous, on-demand access to services provided by servers internal to a network, while minimizing power consumption and power load spikes. Information concerning operation of the network is monitored. This monitoring of information concerning the operation of the network can comprise performing activities such as tracking IP addresses being assigned to internal network computers, gathering listening ports on internal network computers, performing deep packet inspection to identify port and protocol specific parameters, observing connection attempts between computers within the network and observing remote attempts to connect to internal network computers. The resulting monitored network operation information comprises data such as specific clients requesting specific services from specific internal network servers, specific internal network servers providing specific services responsive to service requests and additional specific internal network servers being utilized at a nested level in association with the provision of specific services by specific internal network servers. A profile of the network is maintained, the maintained network profile comprising monitored network operation information.

Internal network servers being in reduced power consumption states is tracked. Service requests from clients to internal network servers that are in reduced power consumption states are detected. This can comprise detecting a first specific service request from a specific client to a specific server internal to the network that is in a reduced power consumption state, and detecting at least one additional service request being made to at least one additional server that is in a reduced power consumption state, the at least one additional service request being made in conjunction with fulfilling the first specific service request. In response to detecting services requests to servers in reduced power consumption states, packets are generated to wake internal network servers that are in reduced power consumption states to which detected service requests are directed. This is done without requiring registration of the servers or clients, and without requiring installation of any components on the servers or clients.

Frequencies are controlled at which packets are generated to wake servers in reduced power consumption states. Controlling frequencies at which packets to wake servers are generated minimizes sudden increases in power consumption associated with waking multiple servers. This controlling of frequencies can comprise waiting for a specific duration of time prior to generating packets to wake servers. More specifically, delays between generation of packets to wake servers can be introduced, for example according to a power management policy. Such a power management policy can specify, for specific server profiles, specific durations of time such as 1) a specific duration of time to delay after waking a first server with the specific server profile, prior to waking a second server, 2) a specific duration of time to delay after waking a first server prior to waking a second server with the specific server profile and 3) a specific duration of time to delay between waking a first server with a first specific server profile, prior to waking a second server with a second specific server profile. In some embodiments, these durations of time are calculated on the fly for specific server profiles. In some embodiments, additional entities on the network generating packets to wake computers in reduced power consumption states are detected, and delays are introduced concerning these detected packet generations as well.

In some embodiments, specific detected service requests to specific servers in a reduced power consumption states are adjudicated as being malicious or benign, and the servers are only woken in response to adjudicating corresponding detected service requests as being benign. In some embodiments, service requests to internal network servers originating from clients external to the network are detected. In response, out of band authentications of the users of the clients are performed, and the internal network servers are only woken in response to users being authenticated.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
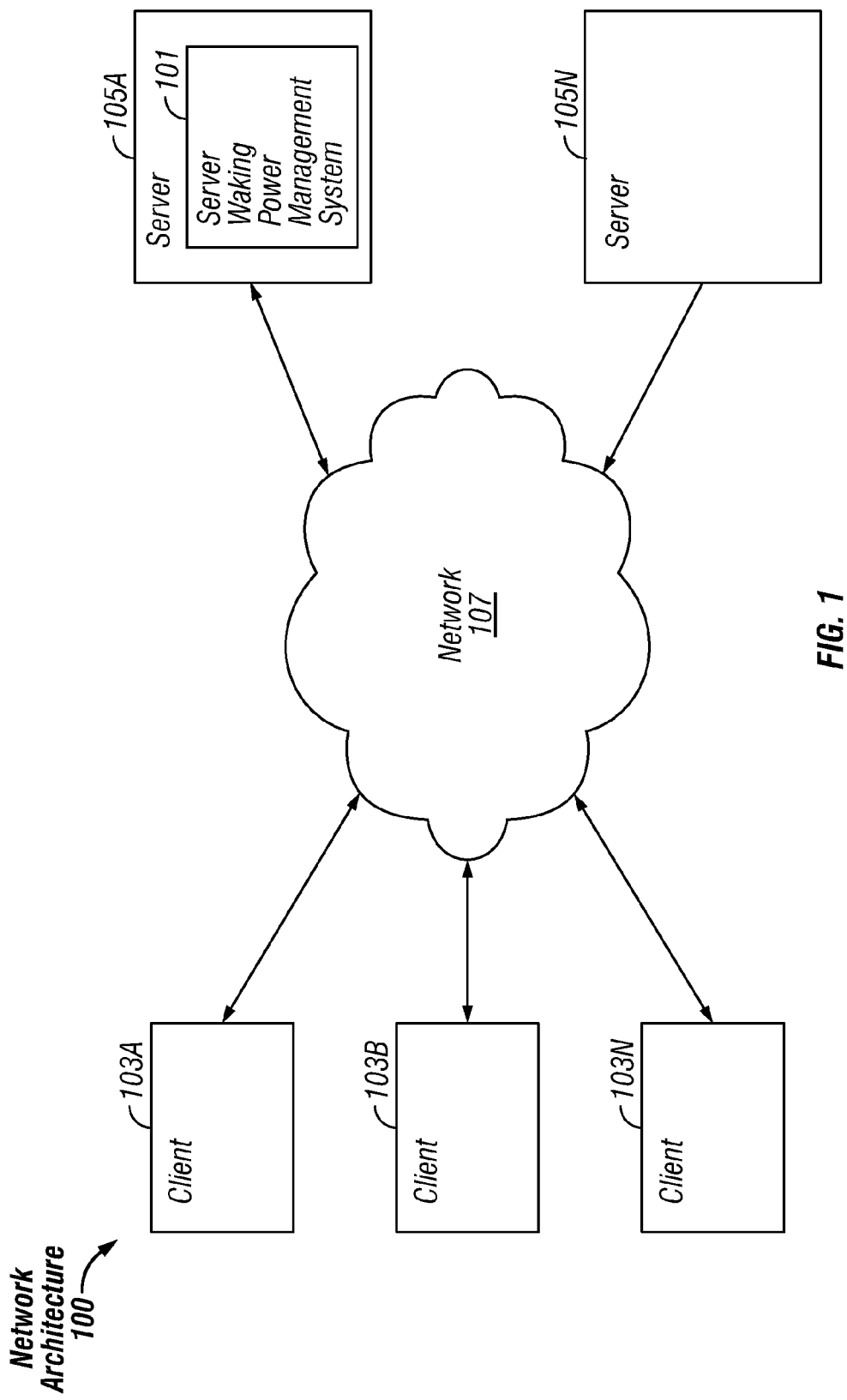
FIG. 1 is a block diagram of an exemplary network architecture in which a server waking power management system can be implemented, according to some embodiments.

FIG. 1 is a block diagram illustrating an exemplary network architecture 100 in which a server waking power management system 101 can be implemented. The illustrated network architecture 100 comprises multiple clients 103A, 103B and 103N, as well as multiple servers 105A and 105N. In FIG. 1, the server waking power management system 101 is illustrated as residing on server 105A. It is to be understood that this is an illustrative example only, and in various embodiments various functionalities of this system 101 can be instantiated on a client 103, a server 105 or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown). For ease of understanding, a computer 210 hosting a service is referred to herein as a server 105 and a computer 210 requesting the service is referred to herein as a client 103. It is to be understood that as the terms are used herein, a single computer can be both a server 105 (by providing a service to a set of clients 103) and a client 103 (by using the respective services of one or more servers 105).

Although FIG. 1 illustrates three clients and two servers as an example, in practice many more (or fewer) clients 103 and/or servers 105 can be deployed. In one embodiment, the network 107 is in the form of a service providing network. Other networks 107 or network-based environments can be used in other embodiments.

Figure 2:
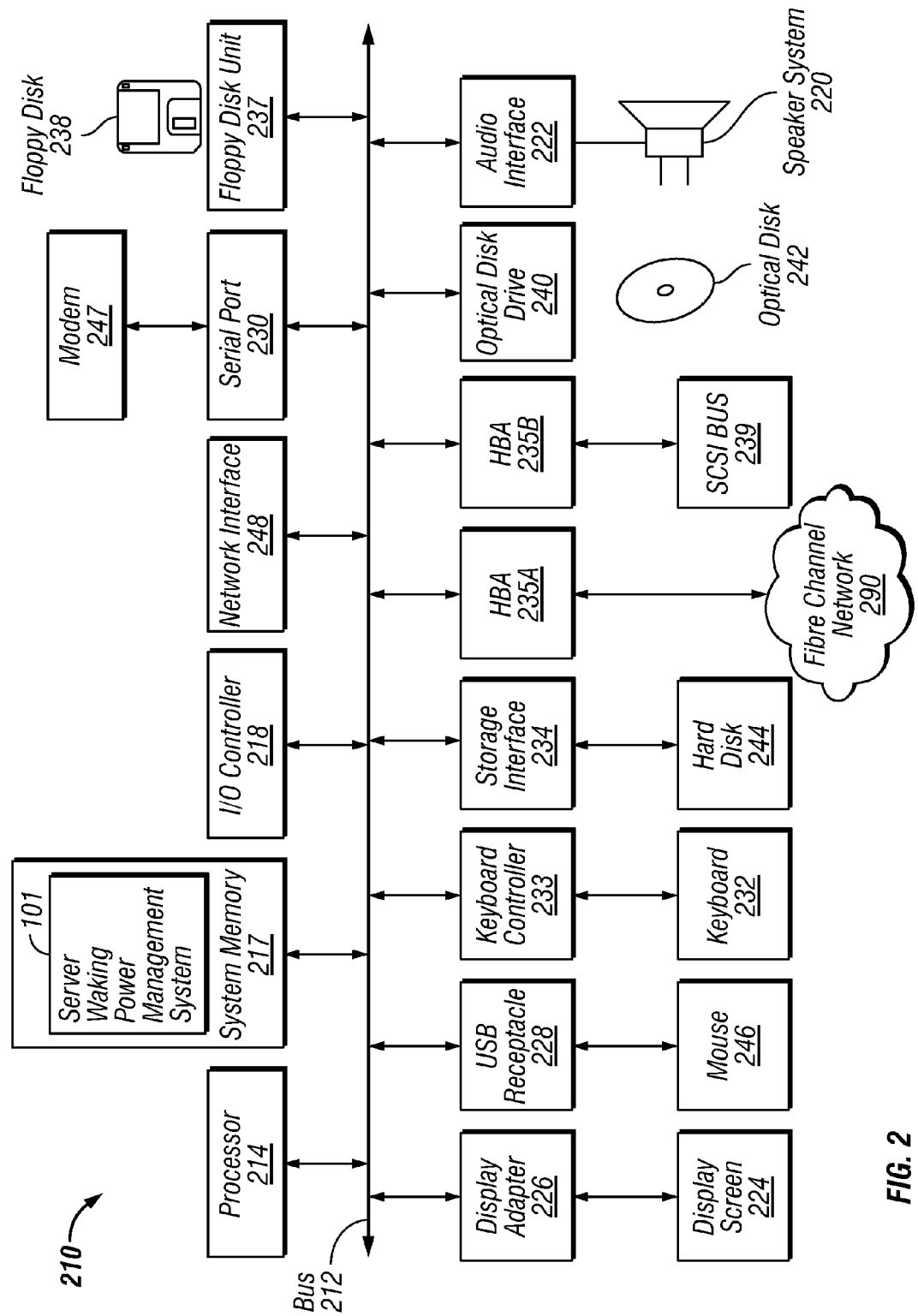
FIG. 2 is a block diagram of a computer system suitable for implementing a server waking power management system, according to some embodiments.

FIG. 2 is a block diagram of a computer system 210 suitable for implementing a server waking power management system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the server waking power management system 101 is illustrated as residing in system memory 217. The workings of the server waking power management system 101 are explained in greater detail below in conjunction with FIGS. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
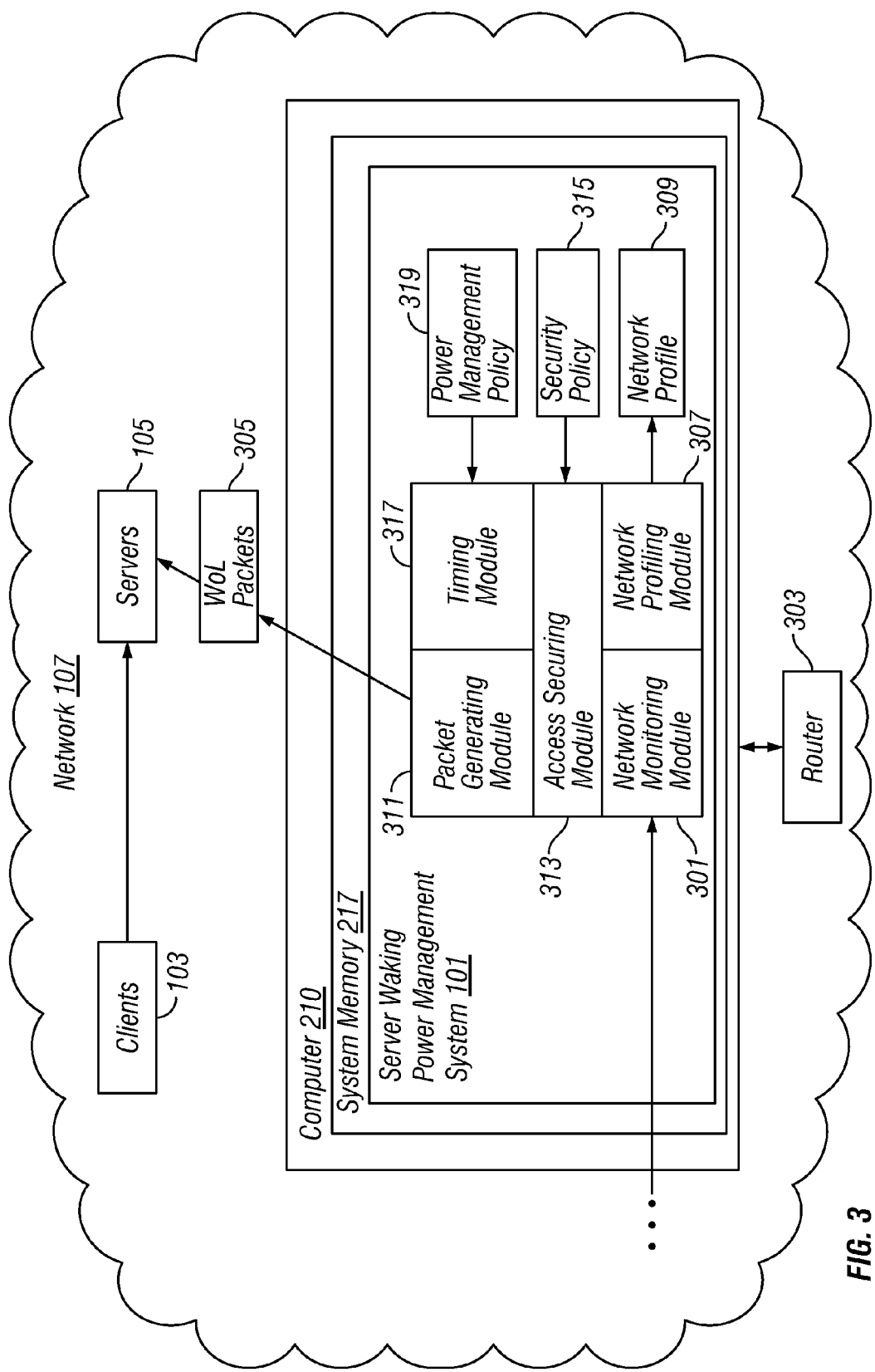
FIG. 3 is a block diagram of the operation of a server waking power management system, according to some embodiments.

FIG. 3 illustrates the operation of a server waking power management system 101 residing in the system memory 217 of a computer 210, according to some embodiments. As described above, the functionalities of the server waking power management system 101 can reside on a server 105, a client 103, or be distributed between multiple computer systems 210, including within a cloud-based computing environment in which the functionality of the server waking power management system 101 is provided as a service over a network 107. It is to be understood that although the server waking power management system 101 is illustrated in FIG. 3 as a single entity, the illustrated server waking power management system 101 represents a collection of functionalities, which can be instantiated as a single or multiple modules as desired (an instantiation of specific, multiple modules of the server waking power management system 101 is illustrated in FIG. 3). It is to be understood that the modules of the server waking power management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the server waking power management system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, a server waking power management system 101 securely facilitates secure 24×7 on-demand service availability while minimizing power consumption and power load spikes. The server waking power management system 101 learns and tracks which services are hosted by which servers 105 within a service providing network 107. When services are requested, the server waking power management system 101 can enforce a security policy 315 restricting access to benign clients 103. Where a service request is adjudicated to be benign, the server waking power management system 101 can send WoL packets 305 (local and/or wireless) to the specific server 105 known to host the requested service, and any dependent servers 105 used to provide that service. In so doing, the server waking power management system 101 enforces a power management policy 319 to avoid triggering sudden power usage and load related spikes that can cause power failures.

More specifically, the server waking power management system 101 (or at least a monitoring module 301 thereof) is deployed on a computer 210 connected to a tap port of a router 303 on the service providing (or other) network 107. In other embodiments, the server waking power management system 101 is deployed on the router 303 itself, or on another facility that enables full network traffic visibility. In any case, the server waking power management system 101 is deployed within the network 107 so as to have full visibility into the network activity of the connected computers 210 (typically both wired and wireless network traffic).

The monitoring module 301 of the server waking power management system 101 monitors and tracks IP addresses being assigned/leased to computers 210 on the network 107 (DHCP). The monitoring module 301 also scans the network 107 periodically to gather listening ports on various computers 210 on the network 107. The monitoring module 301 can perform deep packet inspection to identify port/protocol specific parameters. Additionally, the monitoring module 301 observes connection attempts between computers 210 within the internal network 107, as well as remote attempts to connect to computers 210 internal to the network 107. The monitoring module 301 thus tracks which internal and external clients 103 use which services provided by which internal servers 105 over time.

Using the information gathered by the monitoring module 301, a network profiling module 307 of the server waking power management system 101 maintains a profile 309 of the network 107, including information such as which servers 105 host which services, which nested servers 105 they use to provide these services, which clients 103 have a history of requesting which services from which servers 105, addresses and ports associated with specific computers 210, etc. The exact information to monitor and/or include in the profile 309, as well formatting and storage details, can vary between embodiments.

According to conventional power policy settings, the computers 210 within the network 107, including servers 105 hosting various services, periodically go into reduced power consumption states. This is monitored by the monitoring module 301 (e.g., the monitoring module 301 detects when servers 105 internal to the network 107 go into reduced power consumption states), and the network profiling module 307 can thus keep track of which servers 105 are in reduced power consumption states (e.g., maintaining such information in the profile 309). The monitoring module 301 also detects service requests made by clients 103 to servers 105 that are in reduced power consumption states. In response to such requests, a packet generating module 311 of the server waking power management system 101 can generate WoL packets 305 to wake the corresponding server(s) 105.

In the context of waking servers 105, an access securing module 313 of the server waking power management system 101 can determine whether the client 103 requesting the service is benign or malicious, and only wake the server(s) 105 responsive to benign service requests. For example, the access securing module 313 can read the profile 309 to determine whether the requesting client 103 is known, whether it has a history of requesting the specific service from the targeted server 105 when it was powered up, etc. Requests from unknown clients 103 or clients 103 without a requisite history of requesting the given service can be adjudicated to be malicious.

The access securing module 313 can enforce a security policy 315. Different security policies 315 can specify different sets of circumstances that result in adjudications of malicious and benign service requests in different embodiments. For example, in addition or instead of looking at service request history, a security policy 315 could indicate to adjudicate as benign or malicious service requests from clients 103 with specific profiles (e.g., specific addresses, specific software configurations, etc.). Where a service request is adjudicated to be malicious, no WOL packets 305 are generated to wake the server 105.

In some embodiments, where a service request originates from a client 103 outside of the network 107, the access securing module 313 can perform an out of band authentication of the user of the remote client 103 (using any conventional mechanism for out of band authentication). Once the user of the remote client 103 is authenticated, the security policy 315 can be updated accordingly, and the user's service requests can result in the generation of WoL packets 305 for the corresponding server 105.

A timing module 317 of the server waking power management system 101 can minimize the sudden increase in power demand associated with waking a plurality of servers 105, by controlling the frequency at which WoL packets 305 are utilized to wake servers 105. More specifically, the timing module 317 can delay generating WoL packets 305 as desired, to allow a specific amount of time after waking a first server 105, before waking additional ones. For example, suppose that computer A is a web server 105 providing access to files that are located on computer B, a file server 105. Computer B is further configured to synchronize its files with computer C. Suppose a client 103 attempts to browse to the file list page of computer A while computers A, B and C are all in sleep mode. This would generate a service request that would cause the packet generating module 311 to issue a WoL packet 305 for computer A. When computer A attempts to enumerate the files by issuing an SMB request to computer B, the packet generating module 311 would then issue a WoL packet 305 for computer B in order to facilitate the SMB query from the client 103 (computer A) to the server 105 (computer B). Computer B could then fulfill computer A's service request.

However, computer B would also issue a synchronization related file query request to computer C, resulting in another WoL packet 305 for computer C. If these three service requests occur in quick succession, a power spike or even a blackout could occur. The timing module 317 can prevent this by artificially introducing delays in the generation of the WoL packets 305, thus avoiding a sudden power consumption surge. For example if computer A has just been woken up, a WoL packet 305 to computer B may be deliberately delayed.

The timing module 317 can introduce delays of a specific default length (e.g., one second, five seconds, ten seconds).

The timing module 317 can also enforce a power management policy 319 which defines specific lengths of time to delay after waking servers 105 with specific profiles. For example, if the power management policy 319 specifies to wait five seconds after waking servers with the profiles of computers A, B and C, the timing module can ensure that the WoL packets 305 in the above example are not generated less than five seconds apart. (Delay durations can also be defined as durations to wait prior to waking a server 105 with a given profile, or to wait between waking servers 105 with specific profiles.) The power management policy 319 can specify ideal time intervals between WoL packets 305, taking into account power consumption characteristics of specific hardware profiles according to local settings, and/or by directing the timing module 317 to glean such information in real time, (e.g., from a server or other source that provides hardware specifications, power consumption characteristics, etc.). In some embodiments, the power management policy 319 specifies the exact delay intervals, and in other embodiments these intervals are calculated by the timing module 317 based on profile information.

In some embodiments, the monitoring module 301 also detects WoL packets 305 generated by other entities outside of the server waking power management system 101. In such embodiments, the timing module 317 can take those WoL packets 305 into account as well when introducing delays between WoL packets 305. In some such embodiments, the timing module 317 takes the generation times of externally generated WoL packets 305 as a given, but enforces delays between externally generated WoL packets 305 and those generated by the server waking power management system 101, as it does between multiple WoL packets 305 generated by the server waking power management system 101. In other embodiments, the timing manager goes one step further and introduces delays between externally generated WoL packets 305 as well.

In conclusion, by learning and profiling the configuration of the network 107 automatically, the server waking power management system 101 facilitates the generating and timing of packets 305 to wake servers 105 of any type, responsive to service requests from any type of client 103, without requiring registration of the clients 103 or servers 105 with the system, and without requiring the installation of any software or other components on the clients 103 making the service requests or on the servers 105 being woken. It is to be understood that the functionality to process conventional WoL packets is instantiated at a conventional network interface level, and does not require the installation of any component of the server waking power management system 101 on the servers 105 being woken or the clients 103 making the service requests. By adjudicating between benign and malicious service requests and only waking servers 105 in response to the former, the server waking power management system 101 can enforce a security policy 315 and prevent the unauthorized waking of servers 105. By introducing delays between multiple WoL packets 305 associated with the waking of multiple servers 105 in response to a service request, the server waking power management system 101 can enforce a power management policy 319, thereby minimizing sudden increases in power consumption associated with waking multiple servers 105, thus preventing power spikes and blackouts.

Figure 4:
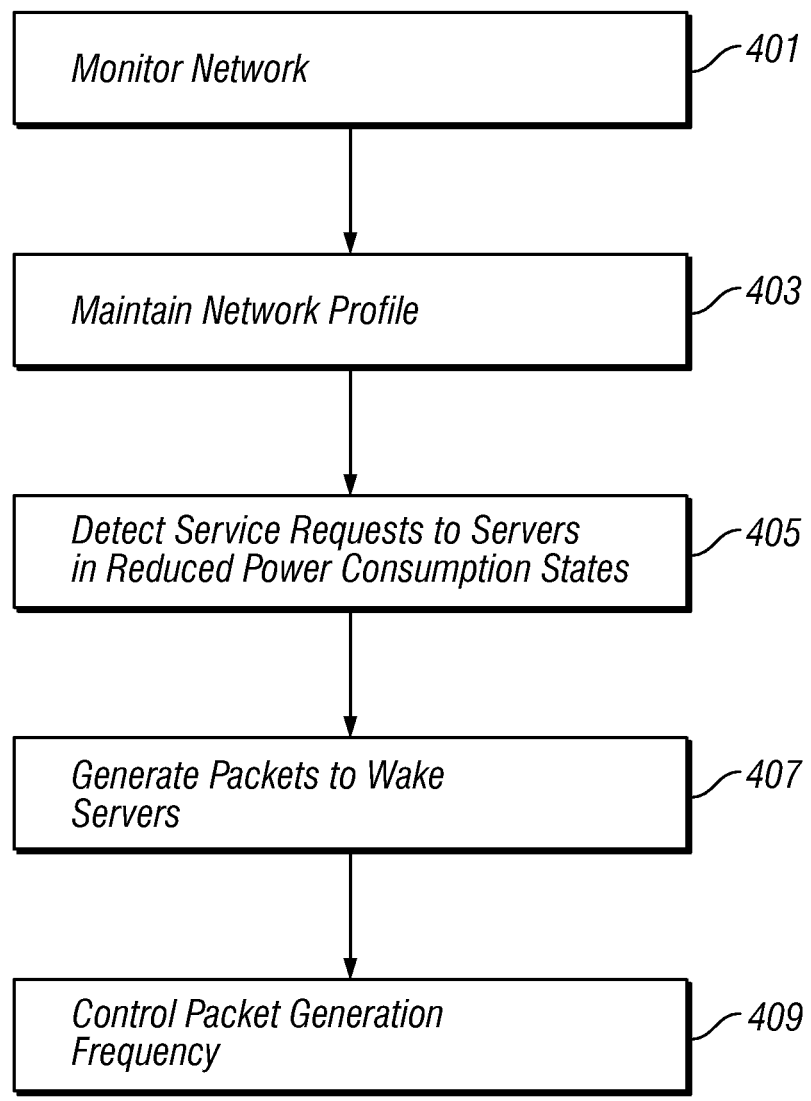
FIG. 4 is a flowchart of the operation of a server waking power management system, according to some embodiments.

FIG. 4 illustrates steps of the operation of the server waking power management system 101 (FIG. 1), according to some embodiments. The monitoring module 301 (FIG. 3) of the server waking power management system 101 (FIG. 1) monitors 401 information concerning operation of the network 107 (FIG. 1), including when internal network servers 105 (FIG.

1) go into reduced power consumption states. The network profiling module 307 (FIG. 3) of the server waking power management system 101 (FIG. 1) maintains 403 a network profile 309 (FIG. 3) comprising monitored network operation information. The monitoring module 301 (FIG. 3) detects 405 service requests from clients 103 (FIG. 1) to internal network servers 105 (FIG. 1) that are in reduced power consumption states. The packet generating module 311 (FIG. 3) of the server waking power management system 101 (FIG. 1) generates 407 packets 305 (FIG. 3) to wake the servers 105. The timing module 317 (FIG. 3) of the server waking power management system 101 (FIG. 1) controls 409 frequencies at which the packets 305 (FIG. 3) to wake the servers 105 (FIG. 1) are generated, thereby minimizing sudden increases in power consumption associated with waking multiple servers 105 (FIG. 1).

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for facilitating secure, continuous, on-demand access to services provided by servers internal to a network, while minimizing power consumption and power load spikes, the method comprising the steps of:
   monitoring, by at least one computer, when servers internal to the network are in reduced power consumption states;
   detecting, by the at least one computer, service requests from clients to servers internal to the network that are in reduced power consumption states;
   generating, by the at least one computer, packets to wake servers internal to the network that are in reduced power consumption states to which detected service requests are directed, responsive to detecting the service requests; and
   controlling, by the at least one computer, frequencies at which packets to wake servers in reduced power consumption states are generated;
   wherein controlling frequencies at which packets to wake servers are generated minimizes sudden increases in power consumption associated with waking multiple servers.

2. The method of claim 1 further comprising:
   monitoring, by the at least one computer, information concerning operation of the network; and
   maintaining, by the at least one computer, a profile of the network, the maintained network profile comprising monitored network operation information;
   wherein said monitored network operation information comprises at least 1) specific clients requesting specific services from specific servers internal to the network; 2) specific servers internal to the network providing specific services responsive to service requests; and 3) additional specific servers internal to the network being utilized at a nested level in association with provision of specific services by specific servers internal to the network.

3. The method of claim 1 wherein monitoring, by the at least one computer, information concerning operation of the network further comprises performing at least one of the following steps:
   tracking IP addresses being assigned to computers internal to the network;
   gathering listening ports on computers internal to the network;
   performing deep packet inspection to identify port specific parameters;
   performing deep packet inspection to identify protocol specific parameters;
   observing connection attempts between computers within the network; and
   observing remote attempts to connect to computers internal to the network.

4. The method of claim 1 wherein detecting, by the at least one computer, service requests from clients to servers internal to the network that are in reduced power consumption states further comprises:
   detecting, by the at least one computer, a first specific service request from a specific client to a specific server internal to the network that is in a reduced power consumption state; and
   detecting, by the at least one computer, at least one additional service request being made to at least one additional server that is in a reduced power consumption state, the at least one additional service request being made in conjunction with fulfilling the first specific service request.

5. The method of claim 1 wherein controlling, by the at least one computer, frequencies at which packets to wake servers are generated further comprises:
   detecting, by the at least one computer, a first specific service request from a specific client to a first specific server internal to the network that is in a reduced power consumption state;
   generating, by the at least one computer, a packet to wake the first specific server, responsive to detecting the service requests;
   detecting, by the at least one computer, at least one additional service request being made to at least one additional server that is in a reduced power consumption state, the at least one additional service request being made in conjunction with fulfilling the first specific service request; and
   waiting, by the at least one computer, for a specific duration of time, prior to generating at least one additional packet to wake the at least one additional server.

6. The method of claim 1 wherein controlling, by the at least one computer, frequencies at which packets to wake servers are generated further comprises:
   introducing, by the at least one computer, at least one delay between generation of packets to wake servers.

7. The method of claim 1 wherein controlling, by the at least one computer, frequencies at which packets to wake servers are generated further comprises:
   introducing, by the at least one computer, delays between generating packets to wake servers according to a power management policy.

8. The method of claim 7 wherein:
the power management policy specifies, for at least one specific server profile, at least one specific duration of time from a group of specific durations consisting of: 1) a specific duration of time to delay after waking a first server with the specific server profile, prior to waking a second server; 2) a specific duration of time to delay after waking a first server prior to waking a second server with the specific server profile; and 3) a specific duration of time to delay between waking a first server with a first specific server profile, prior to waking a second server with a second specific server profile.

9. The method of claim 1 further comprising:
for at least one specific server profile, calculating, by the at least one computer, at least one specific duration of time from a group of specific durations of time consisting of: 1) a specific duration of time to delay after waking a first server with the specific server profile, prior to waking a second server; 2) a specific duration of time to delay after waking a first server prior to waking a second server with the specific server profile; and 3) a specific duration of time to delay between waking a first server with a first specific server profile, prior to waking a second server with a second specific server profile; and
introducing, by the at least one computer, at least one delay of at least one calculated duration of time between generation of packets to wake servers.

10. The method of claim 1 further comprising:
detecting, by the at least one computer, at least one other entity on the network generating packets to wake at least one computer in a reduced power consumption state; and
introducing, by the at least one computer, delays concerning detected generations of packets by the at least one other entity to wake at least one computer.

11. The method of claim 1 further comprising:
adjudicating, by the at least one computer, a specific detected service request to a specific server that is in a reduced power consumption state as being malicious; and
not waking the specific server, by the at least one computer, responsive to adjudicating the specific service request as being malicious.

12. The method of claim 1 further comprising:
only waking servers that are in reduced power consumption states, by the at least one computer, responsive to adjudicating corresponding detected service requests as being benign.

13. The method of claim 1 further comprising:
detecting, by the at least one computer, a service request to a server internal to the network that is in a reduced power consumption state, the service request originating from a client external to the network;
performing, by the at least one computer, an out of band authentication of a user of the client external to the network; and
waking the internal network server that is in a reduced power consumption state, by the at least one computer, only in response to the user being authenticated.

14. The method of claim 1 wherein generating, by the at least one computer, packets to wake servers internal to the network that are in reduced power consumption states to which detected service requests are directed further comprises:
generating, by the at least one computer, packets to wake servers internal to the network that are in reduced power consumption states to which detected service requests are directed, without requiring registration of clients making the service requests and without requiring registration of the servers.

15. The method of claim 1 wherein generating, by the at least one computer, packets to wake servers internal to the network that are in reduced power consumption states to which detected service requests are directed further comprises:
generating, by the at least one computer, packets to wake servers internal to the network that are in reduced power consumption states to which detected service requests are directed, without requiring installation of any components on clients making the service requests and without requiring installation of any components on the servers.

16. At least one non-transitory computer storage medium storing a computer program product for facilitating secure, continuous, on-demand access to services provided by servers internal to a network, while minimizing power consumption and power load spikes, the computer program product comprising:
program code for monitoring when servers internal to the network are in reduced power consumption states;
program code for detecting service requests from clients to servers internal to the network that are in reduced power consumption states;
program code for generating packets to wake servers internal to the network that are in reduced power consumption states to which detected service requests are directed, responsive to detecting the service requests; and
program code for controlling frequencies at which packets to wake servers in reduced power consumption states are generated;
wherein controlling frequencies at which packets to wake servers are generated minimizes sudden increases in power consumption associated with waking multiple servers.

17. The computer program product of claim 16 further comprising:
program code for monitoring information concerning operation of the network; and
program code for maintaining a profile of the network, the maintained network profile comprising monitored network operation information;
wherein said monitored network operation information comprises at least 1) specific clients requesting specific services from specific servers internal to the network; 2) specific servers internal to the network providing specific services responsive to service requests; and 3) additional specific servers internal to the network being utilized at a nested level in association with provision of specific services by specific servers internal to the network.

18. The computer program product of claim 16 wherein the program code for controlling frequencies at which packets to wake servers are generated further comprises:
program code for introducing delays between generating packets to wake servers according to a power management policy;
wherein the power management policy specifies, for at least one specific server profile, at least one specific duration of time from a group of specific durations consisting of: 1) a specific duration of time to delay after waking a first server with the specific server profile, prior to waking a second server; 2) a specific duration of time to delay after waking a first server prior to waking a second server with the specific server profile; and 3) a specific duration of time to delay between waking a first server with a first specific server profile, prior to waking a second server with a second specific server profile.

19. The computer program product of claim 16 wherein the program code for generating packets to wake servers internal to the network that are in reduced power consumption states to which detected service requests are directed further comprises:

program code for generating packets to wake servers internal to the network that are in reduced power consumption states to which detected service requests are directed, without requiring registration of clients making the service requests and without requiring registration of the servers; and program code for generating packets to wake servers internal to the network that are in reduced power consumption states to which detected service requests are directed, without requiring installation of any components on clients making the service requests and without requiring installation of any components on the servers.

20. A computer system for facilitating secure, continuous, on-demand access to services provided by servers internal to a network, while minimizing power consumption and power load spikes, the computer system:

a processor;

system memory;

a monitoring module residing in the system memory, the monitoring module being configured for monitoring when servers internal to the network are in reduced power consumption states, and for detecting service requests from clients to servers internal to the network that are in reduced power consumption states;

a packet generating module residing in the system memory, the packet generating module being configured for generating packets to wake servers internal to the network that are in reduced power consumption states to which detected service requests are directed, responsive to detecting the service requests; and a timing module residing in the system memory, the timing module being configured for controlling frequencies at which packets to wake servers in reduced power consumption states are generated;

wherein controlling frequencies at which packets to wake servers are generated minimizes sudden increases in power consumption associated with waking multiple servers.

* * * * *